United States Patent
Yerushalmi et al.

(10) Patent No.: US 6,203,703 B1
(45) Date of Patent: Mar. 20, 2001

(54) METHOD AND SYSTEM FOR BIOREMEDIATION OF HYDROCARBON CONTAMINATED WATER

(75) Inventors: Laleh Yerushalmi, Cote St. Luc; Serge R. Guiot, Montreal, both of (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/336,780

(22) Filed: Jun. 21, 1999

Related U.S. Application Data

(63) Continuation-in-part of application No. 08/972,468, filed on Nov. 18, 1997, now abandoned.

(51) Int. Cl.[7] ................................................. C02F 3/06
(52) U.S. Cl. .................... 210/615; 210/170; 435/176; 435/180; 405/128; 405/263
(58) Field of Search .................. 405/128, 263; 435/180, 176; 210/615, 616, 617, 170, 922, 150

(56) References Cited

U.S. PATENT DOCUMENTS

| | | | |
|---|---|---|---|
| 2,602,651 | * | 7/1952 | Cannon . |
| 4,039,437 | * | 8/1977 | Smith et al. . |
| 4,741,806 | * | 5/1988 | Scinta . |
| 4,908,129 | * | 3/1990 | Finsterwalder . |
| 5,217,616 | * | 6/1993 | Sanyal et al. ..................... 210/617 |
| 5,344,557 | * | 9/1994 | Scanzillo . |
| 5,352,357 | * | 10/1994 | Perry . |
| 5,362,394 | * | 11/1994 | Blowes . |
| 5,466,373 | * | 11/1995 | Handwerker . |
| 5,565,103 | * | 10/1996 | Eto . |
| 5,620,602 | * | 4/1997 | Stuth . |
| 5,626,437 | * | 5/1997 | Hunt et al. ......................... 405/128 |
| 5,641,642 | * | 6/1997 | Peyton . |
| 5,733,453 | * | 3/1998 | Debusk . |
| 5,893,975 | * | 4/1999 | Eifert . |
| 5,906,745 | * | 5/1999 | Eto . |
| 5,910,248 | * | 6/1999 | Tlok . |
| 5,981,272 | * | 11/1999 | Chang . |
| 6,110,389 | * | 8/2000 | Horowitz . |

OTHER PUBLICATIONS

Fox et al., Anaerobic treatment of a biologically inhibitory wastewater, Journal Water Pollution Control Federation, vol. 60, p. 86–92, 1988.*

Ballast® ring packaging at Century Plastic's http://www.centuryplastics.com/ballast.htm downloaded 9/10/00.*

BIO–RING® packing at Century Plastic's http://www.centuryplasticsinc.com/bio–ring.htm downloaded 9/10/00.*

Starr, et al., "In Situ Remediation of Contaminated Ground Water: The Funnel–and–Gate System,38 Ground Water: The Funnel–and–Gate System," Ground Water May/Jun. 1994, pp. 465–476.*

* cited by examiner

*Primary Examiner*—Chester T. Barry

(57) ABSTRACT

A method and reactor for decontaminating underground aqueous plumes containing gasoline or other petroleum-derived hydrocarbons. The reactor contains a solid, non-sorptive packing, e.g a stainless steel foraminous packing which is characterized by a free space of at least 75%. The packing carries a microbial heterogeneous population derived from soil indigenous microbial community. The contaminated stream is passed through the bed in microaemphilic conditions. The performance of the process is better than that of a comparable process and apparatus using granulated peat moss.

7 Claims, 7 Drawing Sheets

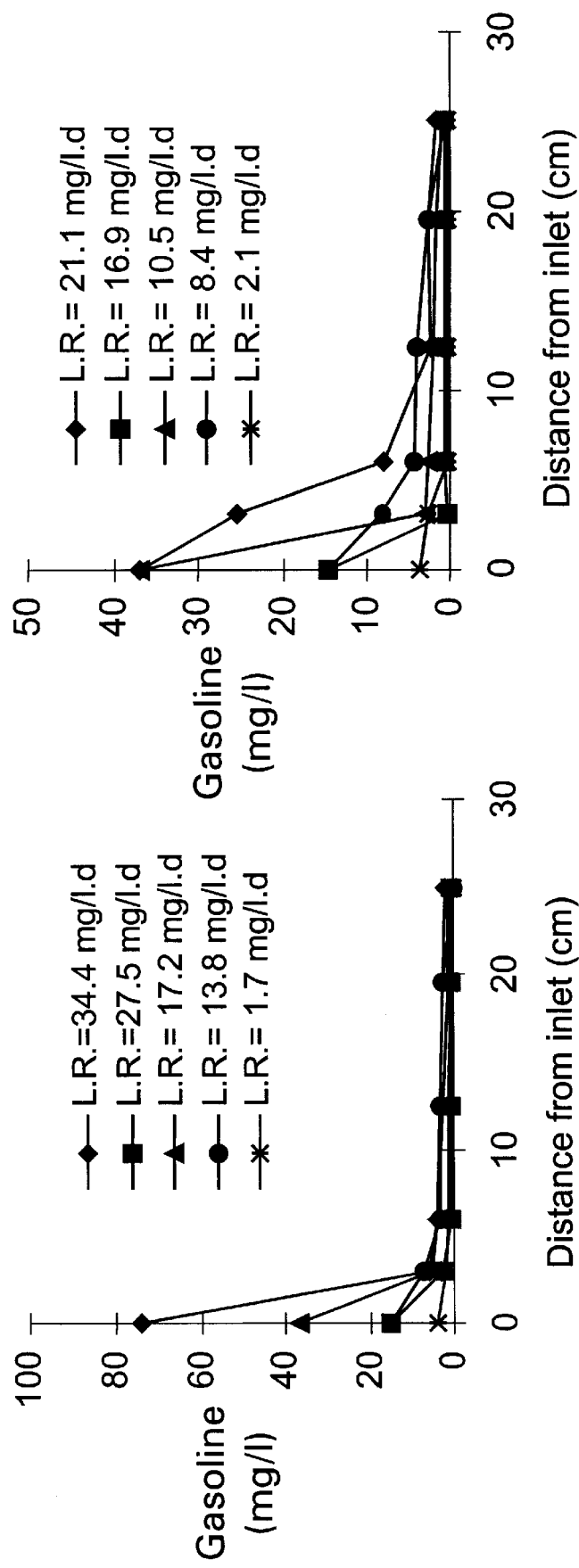

METHOD AND SYSTEM FOR BIOREMEDIATION OF HYDROCARBON CONTAMINATED WATER

This application is a continuation-in-part of Ser. No. 08/972,468 filed Nov. 18, 1997 now abandoned.

FIELD OF THE INVENTION

This invention relates to systems for biological remediation of water contaminated with hydrocarbons, and more specifically, to such systems operating underground, typically under oxygen-limited conditions.

BACKGROUND OF THE INVENTION

Gasoline and some other petroleum-derived hydrocarbons are among the most common contaminants of soil and groundwater. These compounds often mix with drinking water causing serious health concerns. Development of effective and economical remediation techniques is essential since groundwater is a source of drinking water in many areas of the world.

Known treatment techniques involve pump-and-treat methods, air stripping and steam flushing combined with vacuum extraction. Natural attenuation processes have been shown to reduce the concentration of contaminants in soil and groundwater, but these processes are usually slow and may take many years to decontaminate an affected area.

Recently, permeable under-ground walls and barriers have gained recognition as an alternative for the treatment of groundwater. Such techniques are more economical when implemented in-situ rather than ex-situ. The former also removes the need to transfer the affected material from the site thus eliminating the risk of phase transformation of volatile compounds. The underground biobarriers are passive reactors as they operate by natural hydraulic gradients of the underground stream, and they do not need pumping equipment to supply the contaminated stream to the reactor nor to pass the treated stream back underground. There is therefore a substantial difference between the in-situ passive underground biobarriers and above-ground ex-situ biological reactors for similar purposes (bioremediation of underground contaminated streams), the latter exemplified by U.S. Pat. No. 5,080,782 to Caplan.

Biological in-situ techniques and systems are particularly attractive compared with chemical ones since they have the potential to completely destroy the target contaminants leaving non-toxic chemicals as the products of biodegradation. The so-called in-situ bioremediation techniques have been successfully applied in the remediation of groundwater contaminated with petroleum hydrocarbons and chlorinated compounds.

Starr and Cherry (Ground Water, Vol. 32, NO. 3, May–June 1994) discuss various types of in-situ reactors and the packings used. Some reactors use a packing that modifies pH or Eh conditions in the subsurface. Others use a material (e.g. hydroxyapatite) that dissolves or causes precipitation of a mineral phase that immobilizes the contaminant. Another type of reactor removes contaminants mostly by sorption. Activated carbon and peat moss are the most commonly used materials in this category. Zeolites or synthetic ion exchange resins can also be used.

A number of patents pertain to various structures and features of the in-situ biological barriers for removal of organic contaminants. Exemplary in this regard are U.S. Pat. No. 5,057,221 to Bryant et al.; U.S. Pat. No. 5,384,048 to Hazen et al.; U.S. Pat. No. 5,624,552 to Vales et al.; U.S. Pat. No. 5,628,364 to Trenz; U.S. Pat. No. 5,518,620 to Eguchi et al.; and U.S. Pat. No. 5,389,248 to Pare et al. Bryant et al. deal with halogenated hydrocarbons and use activated carbon bed to support methylotrophic and heterotrophic microorganisms thereon. The specification mentions, without elaboration, that other substrates can also be utilized.

SUMMARY OF THE INVENTION

While the prior art in-situ biobarriers are useful to remove organic contaminants to a certain degree from underground plumes, they use mostly organic, particulate, compressible, highly porous packing such as peat moss, zeolite or activated carbon. The removal of contaminants is due in part to microbial transformation due to the presence of microorganisms that develop on the packing, and in part to physical-chemical sorption. As is commonly known, sorption may reach saturation necessitating a periodic removal of the packing for regeneration.

It has now been found that unexpectedly good performance of an underground-disposed, gravity in-situ biological reactor, a so-called biobarrier, may be assured by using, as a packing of the reactor, a material having the following characteristics:

solid, rigid (i.e. practically non-compressible as opposed to peat moss, activated carbon or zeolite) and non-sorptive, preferably consisting of discrete separable pieces or elements;

preferably non-corrosive in the prevailing conditions of an underground bioremediation process, e.g. made of stainless steel; and when deposited in the reactor, having a free space of more than about 75%.

The biological reactor, or biobarrier, has the following characteristics:

The reactor has an underground-disposed chamber having an inlet adapted so as to allow a flow by gravity, or hydraulic forces naturally-occurring underground, of an underground mixture or stream of contaminants to be treated, through the chamber. The reactor can therefore be devoid of any pumping equipment which would be necessary if the reactor was disposed above-ground and the underground stream of contaminants was to be lifted to the above-ground reactor level.

Further, the reactor has an outlet for the stream after treatment. The reactor contains a volume of a solid, substantially rigid, non-sorptive packing disposed in said chamber, said packing disposed such as to leave a free space of at least 75%, and an amount of microorganisms disposed on and within the packing, said microorganisms effective to at least partially biodegrade said hydrocarbons from said mixture or stream.

Since the flow of the contaminants through the chamber and the packing with the microorganisms is by gravity, and considering that the pressure gradient in the underground contaminant stream (plume) is typically relatively small, the packing is stationary during operation, even if it consists of discrete pieces or elements.

Exemplary packing materials meeting the above conditions are rigid, non-sorptive plastic shapes (as opposed to flexible films and sheets), non-corrosive metals and ceramic shapes. A number of packings suitable for the above purpose is already known on the market and used in chemical industry. It is hereby proposed to use those in the underground bioremediation process of the invention.

In accordance with another aspect of the invention, there is provided a method of at least partially biodegrading petroleum derived hydrocarbons present in an underground aqueous mixture or stream, the method comprising supporting a population of microorganisms specific to petroleum-derived hydrocarbons on a substrate packing confined in a chamber disposed underground in the path of an underground stream to be treated, the chamber configured to allow said mixture or stream to flow therethrough by gravity or naturally occurring hydraulic forces, such that said stream or mixture contacts said microorganisms, and passing said aqueous stream or mixture through said packing such that said microorganisms decompose at least partly said hydrocarbons in said mixture or stream as it flows through said packing, wherein said packing comprises solid, substantially rigid non-sorptive elements which leave a free space of at least 75%.

The process is carried out in predominantly microaerophilic conditions in said mixture or stream during its passing through said packing. "Microaerophilic" denotes a low dissolved oxygen concentration in the stream, less than about 2 mg/liter.

BRIEF DESCRIPTION OF THE DRAWINGS

In the drawings which illustrate the invention and its performance in more detail, FIG. 6a is a graph showing concentration profiles of gasoline along the length of the bioreactor containing stainless steel packing, FIG. 6b is a similar graph as 6a for a peat moss packed bioreactor.

DETAILED DESCRIPTION OF THE INVENTION

Figure 1:
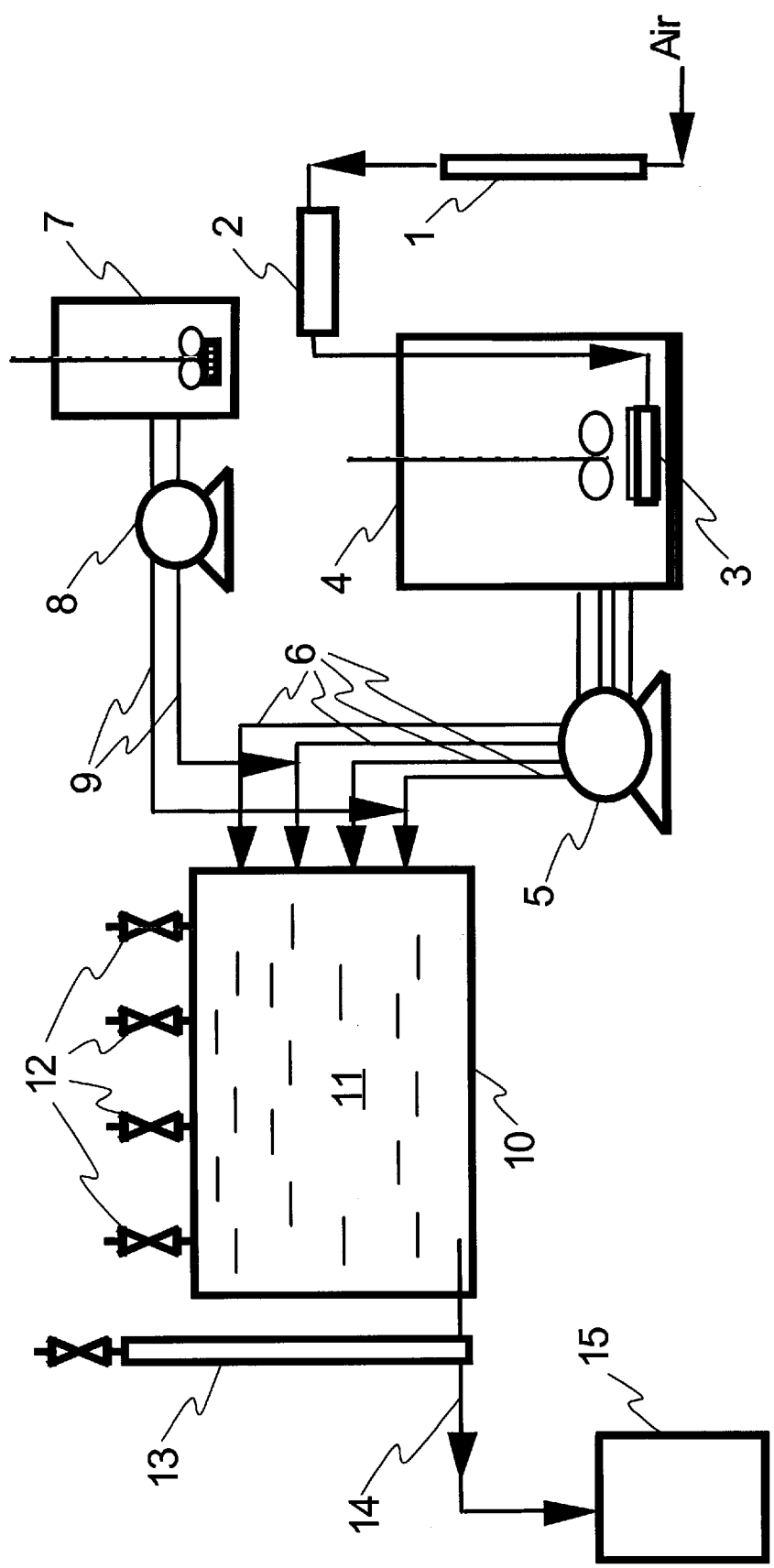
FIG. 1 is a schematic view of an exemplary apparatus for continuous bioremediation of a gasoline containing liquid.

The present work discusses the development and the performance of a packed-bed biobarrier system for the treatment of contaminated soil and groundwater under oxygen-limited conditions. Remediation of groundwater under anoxic or oxygen-limited conditions is very important due to the limited supply or complete lack of available oxygen under in situ conditions. In fact, oxygen limitation is one of the major problems affecting the performance of in situ biological treatment systems. Also, supplying alternative electron acceptors such as sulfate is more economical and more convenient since it does not cause clogging of soil due to aerobic oxidation of iron.

The system used herein, also referred to as a permeable bioreactive barrier, uses a packed-bed permeable bioreactor to support the growth of free as well as immobilized microorganisms originating from soil indigenous microbial population. A series of laboratory-scale experiments evaluated bioremediation of water contaminated with gasoline and other petroleum hydrocarbons by the biobarrier, using protruded stainless steel as the packing material. The performance of the biobarrier was compared with that of a similar system using granulated peat moss as the packing material.

Isolation of the Microbial Culture

The microbial culture used as the inoculum for the biobarriers was isolated by enrichment techniques from the top layers of a gasoline-contaminated soil sample. A 10% soil sample was added to a minimal salts medium (MSM) described below and incubated for two weeks. Commercial gasoline with concentrations of 74 mg/l was used as the source of carbon and energy for the microorganisms. The culture was enriched by regular transfers of 10% (v/v) inoculum every two weeks into a MSM medium containing 74 mg/l gasoline.

A minimal salts medium (MSM) with the following composition was used for culture enrichment as well as the biobarriers' feed, in (g/l): $KH_2PO_4$, 0.87; $K_2H\ PO_4$, 2.26; $(NH_4)_2\ SO_4$, 1.1; and $Mg\ SO_4.7H_2O$, 0.097. To this solution was added 1 ml (per liter) of a trace metals solution composed of, in (g/l): $Co\ (NO_3)_2.\ 6H_2O$, 0.291; $AlK\ (SO_4)_2.\ 12H_2O$, 0.474; $Cu\ SO_4$, 0.16; $Zn\ SO_4.\ 7H_2O$, 0.288; $Fe\ SO_4.\ 7H_2O$, 2.78; $Mn\ SO_4.\ H_2O$, 1.69; $Na_2\ MoO_4.\ 2H_2O$, 0.482; and $Ca\ (NO_3)_2.\ 4H_2O$; 2.362. The final pH of the medium was 6.9–7.1. The medium was sterilized by autoclaving at 120° C. for 20 minutes.

Biobarrier Packing

Two different types of packing material provided support for the microbial biofilm in the biobarriers. They included protruded stainless steel (Cannon Instrument Company, Pa., U.S.A) and granulated peat moss (Produits Recyclable Bioforet, Quebec, Canada). The Pro-Pak S.S. packings were 0.6×0.6 cm in size and had an average particle density of 5.13 g/ml with a free space of 93%. The bulk density of the packing was 0.30 g/ml. The granulated peat moss had an average diameter of 0.4 to 0.7 cm, a particle density of 0.64 g/ml, bulk density 0.29 g/ml and a free space of 57%. The packings were soaked in MSM medium and autoclaved (120° C., 20 minutes) before use.

Biobarrier Operation The reactors, termed herein also biobarriers, consisted of a stainless steel body with a rectangular cross sectional area and a total volume of 5.0 liters. They were equipped with two glass windows and several ports on the sides as well as the top for feeding, liquid recirculation during the initial batch operation and sampling.

As illustrated in FIG. 1, the apparatus for a continuous, laboratory-scale operation of the biobarrier has a tank 10 to which a gasoline solution (in MSM) is supplied from solution tank 7 by way of a pump 8 through gasoline lines 9. Air is supplied through a rotameter 1 and a filter 2 into a feed tank 4 having an air diffuser 3 therein. Feed pump 5 supplies the feed (MSM) through feed lines 6 into the reactor 10 where the feed is mixed with the gasoline solution. Ports 12 are installed on the reactor for process monitoring. Effluent from the reactor 10 flows to an effluent tank 15 through effluent lines 14. The side tower 13 is used for the analysis of gas phase which is in equilibrium with the liquid phase inside the biobarrier.

The feed (MSM) was continuously agitated and sparged with sterile air in order to provide oxygen for the process. A four-channel peristaltic pump model Gilson Minipuls 2 (Gilson Medical Electronics, Wisconsin., U.S.A) was used to deliver feed to the four inlet ports on the side of the biobarriers. Two peristaltic pumps model Masterflex (Cole Palmer Instrument Company, Illinois, U.S.A) were used to introduce gasoline solution containing 370 mg/l gasoline in MSM medium into the biobarriers.

Experiments were performed at room temperature (~25° C.). Gasoline removal was evaluated by analyzing gas and liquid samples of the effluent. Gas samples were taken from a side tower 13 located on the outlet port of the biobarriers. The gas phase in the side tower was in equilibrium with the liquid phase inside the biobarrier.

The gasoline loading rate was increased step-wise by keeping a constant hydraulic retention time (HRT) while increasing the inlet gasoline concentration. The packings were thoroughly saturated with liquid leaving no visible air pockets or channels inside. There was no compaction of the packings for the entire duration of the experiments which lasted over nine months.

The efficiency of biobarriers in the removal of gasoline during the continuous mode of operation was evaluated according to their removal efficiency (RE) and elimination rate (ER) as defined by the following equations:

$$\text{Removal Efficiency (RE)} = (S_i - S_e) * 100 / S_i \quad (1)$$

$$\text{Elimination Rate (ER)} = Q(S_i - S_e) / V_f \quad (2)$$

The loading rate of the reactors was expressed as:

$$\text{Loading rate (L.R.)} = S_i * Q / V_f \quad (3)$$

where $S_i$ is the inlet concentration of a compound to be removed (mg/l), $S_e$ is the outlet concentration of the compound (mg/l), Q is the inlet feed flow rate (l/d) and $V_f$ is the occupied volume of the biobarrier (l).

During the continuous operation of the biobarriers, the inlet gasoline concentration changed from 3.7 to 74.0 mg/l while the hydraulic retention time (HRT) ranged from 0.5 to 6 days, corresponding to linear liquid velocities of 50 to 4.2 cm/d. These values correspond to gasoline loading rates of 1.1 to 68.8 mg/l.d in the stainless steel-packed and 0.7 to 42.2 mg/l.d in the peat moss-packed biobarriers.

Both biobarriers exhibited high gasoline removal efficiencies under all the conditions examined. Removal efficiencies ranged from 94.0% to 99.9% in the stainless steel-packed biobarrier, and from 86.6% to 99.6% in the peat moss-packed biobarrier (Table 1). Under these conditions, the resulting overall gasoline elimination rates ranged from 1.1 to 64.8 mg/l.d and from 0.6 to 41.3 mg/l.d in the two respective biobarriers as calculated from Equation 2.

In the stainless steel-packed biobarrier, a consistently high efficiency of more than 99% was observed except for the condition with the highest gasoline loading rate of 68.8 mg/l.d, where the gasoline removal efficiency decreased to less than 95%. At this condition, the effluent contained the highest concentration of benzene, toluene, ethylene and xylenes (BTEX), 0.3 mg/l. In the peat moss-packed biobarrier, the lowest efficiency of degradation (86.6%) was obtained when HRT was 3 days and inlet gasoline concentration was 3.7 mg/l. The gasoline removal efficiencies at other operating conditions using 3.7 mg/l gasoline were also relatively lower than those obtained at higher inlet gasoline concentrations. At HRT of 0.5 day, the low retention time prevented a complete biodegradation of gasoline resulting in removal efficiency of less than 90%.

Figure 2:
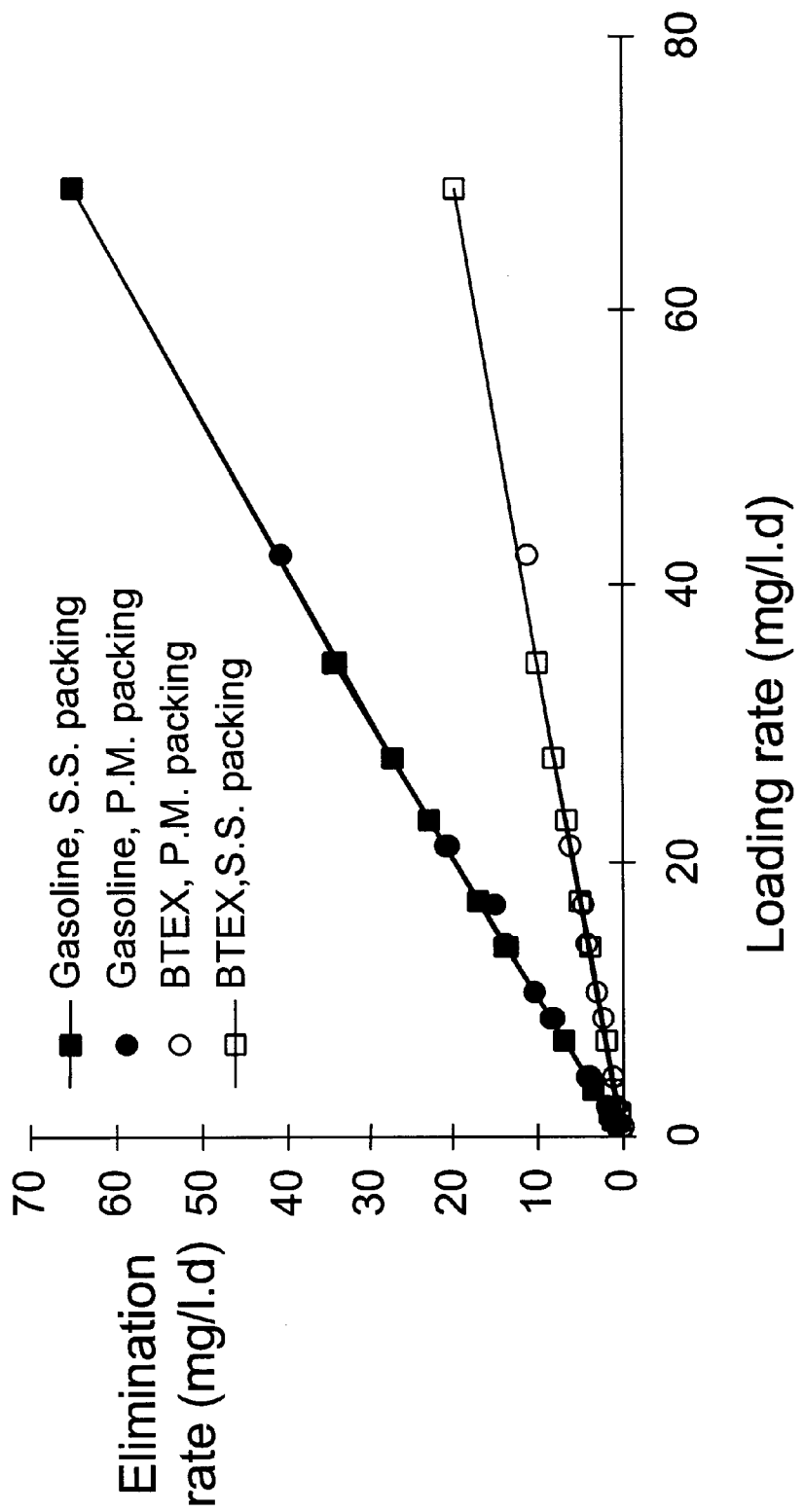
FIG. 2 is a graph illustrating the comparative performance of the reactor using stainless steel packing and peat moss packing.

The overall performance of the biobarrier in terms of the variations of gasoline and BTEX elimination rates with the increase of gasoline loading rate is presented in FIG. 2. A linear relationship, passing through the origin was exhibited. As suggested by some researchers, the observed linearity indicates the independence of the removal efficiency from the gasoline loading rate over the entire range of the experimental conditions. Overall gasoline and BTEX removal efficiencies of 98% and 99.9% were obtained from the slope of the curves (FIG. 2).

Figure 3B:
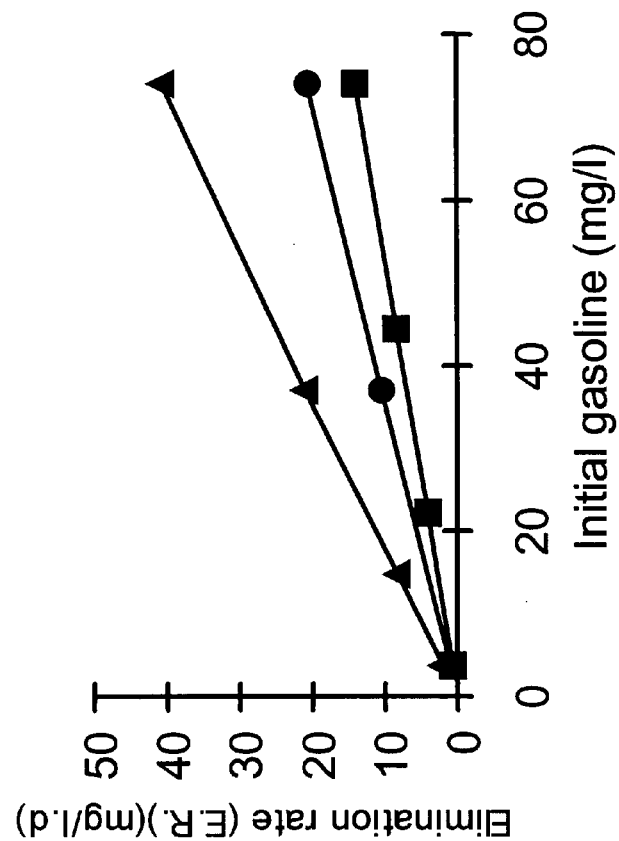
FIG. 3b is a graph showing gasoline elimination rate using a peat moss-packed reactor.
Figure 3A:
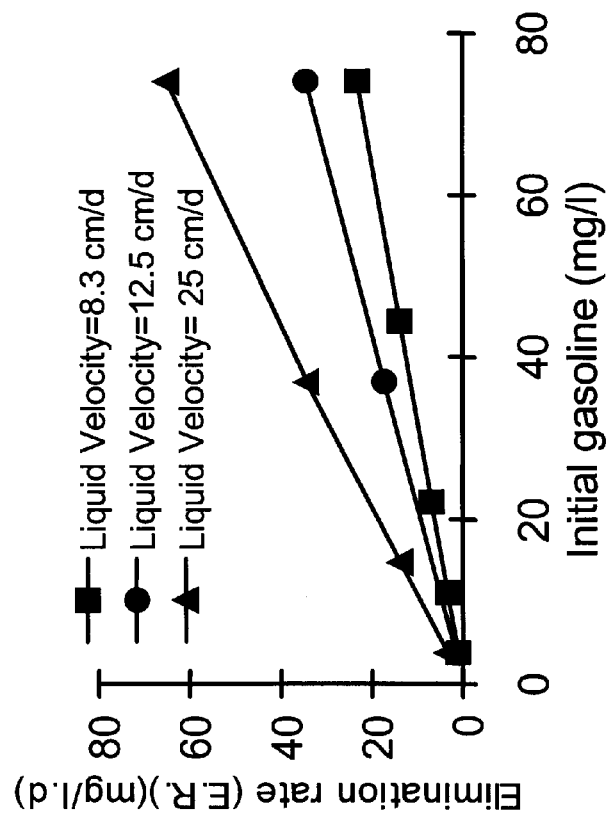
FIG. 3a is a graph showing gasoline elimination rate in a reactor using stainless steel packing of the invention.

The variations of gasoline elimination rate with the inlet gasoline concentration in both biobarriers are presented in FIG. 3a and 3b (SS and peat moss packing respectively). The linearity of the curves in FIGS. 2, 3a and 3b implies that under the applied experimental conditions, the elimination rate of gasoline was only controlled by the biobarriers' operating conditions and not by the microbial biodegradation kinetics. These graphs also demonstrate lower elimination rates obtained with the peat moss-packed biobarrier compared to that obtained with the stainless steel-packed biobarrier under identical operating conditions. The observed difference is caused by the lower available free space in the peat moss-packed biobarrier which reduced the liquid volume and the corresponding flow rate at any given liquid velocity, resulting in lower elimination rates (Equation 2).

Dynamic Behavior of the Biobarriers

Figure 4:
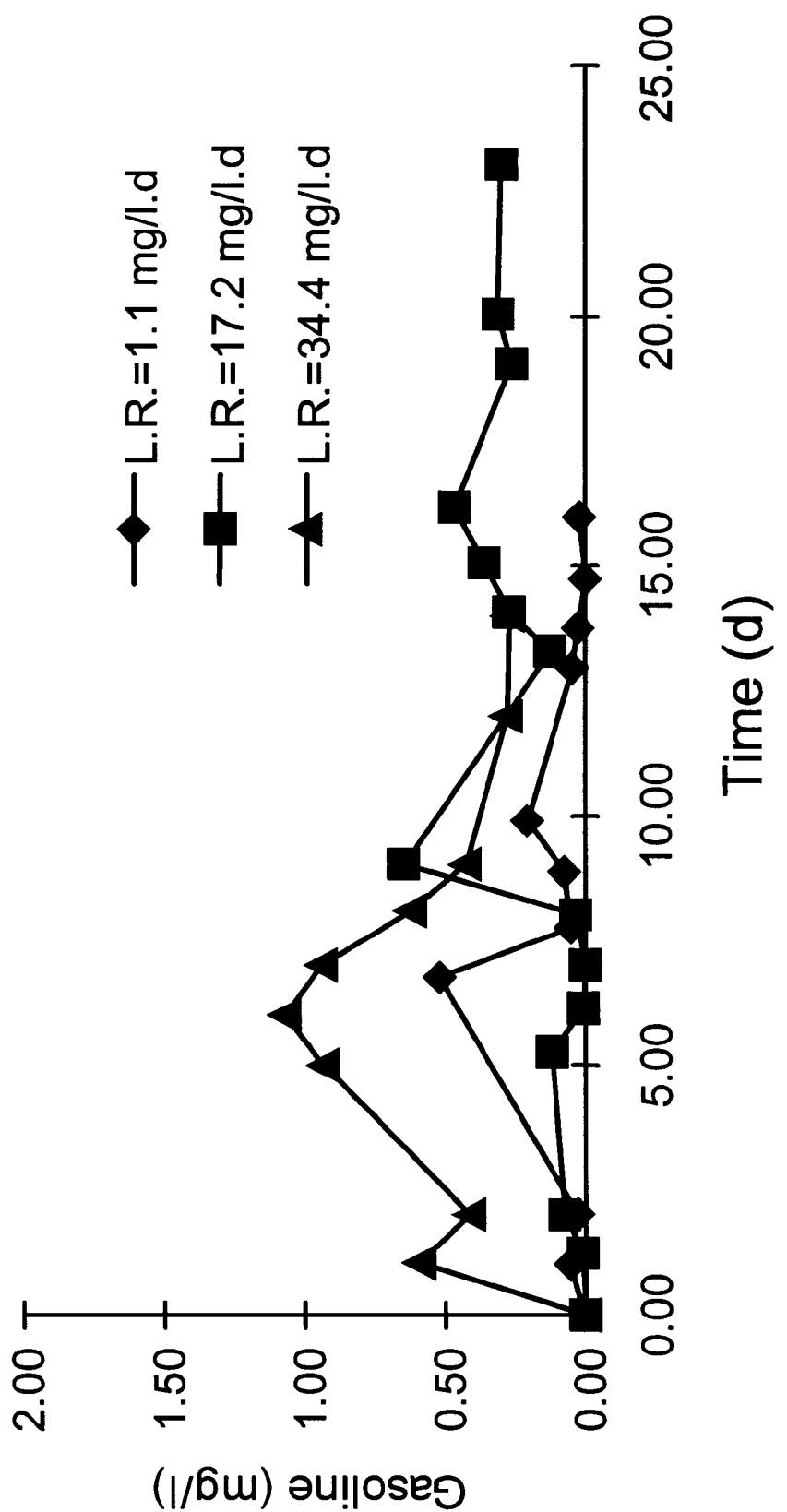
FIG. 4 is a graph illustrating dynamic behavior of a SS-packed reactor.

The dynamic behavior of the biobarrier in the removal of gasoline is shown in FIG. 4. The output concentration was usually steady under most operating conditions examined. The profiles in FIG. 4 present examples of the most unstable performances of the stainless steel-packed biobarrier, demonstrating an oscillatory effluent concentration caused by the transitional state of the system before reaching steady state.

Figure 5:
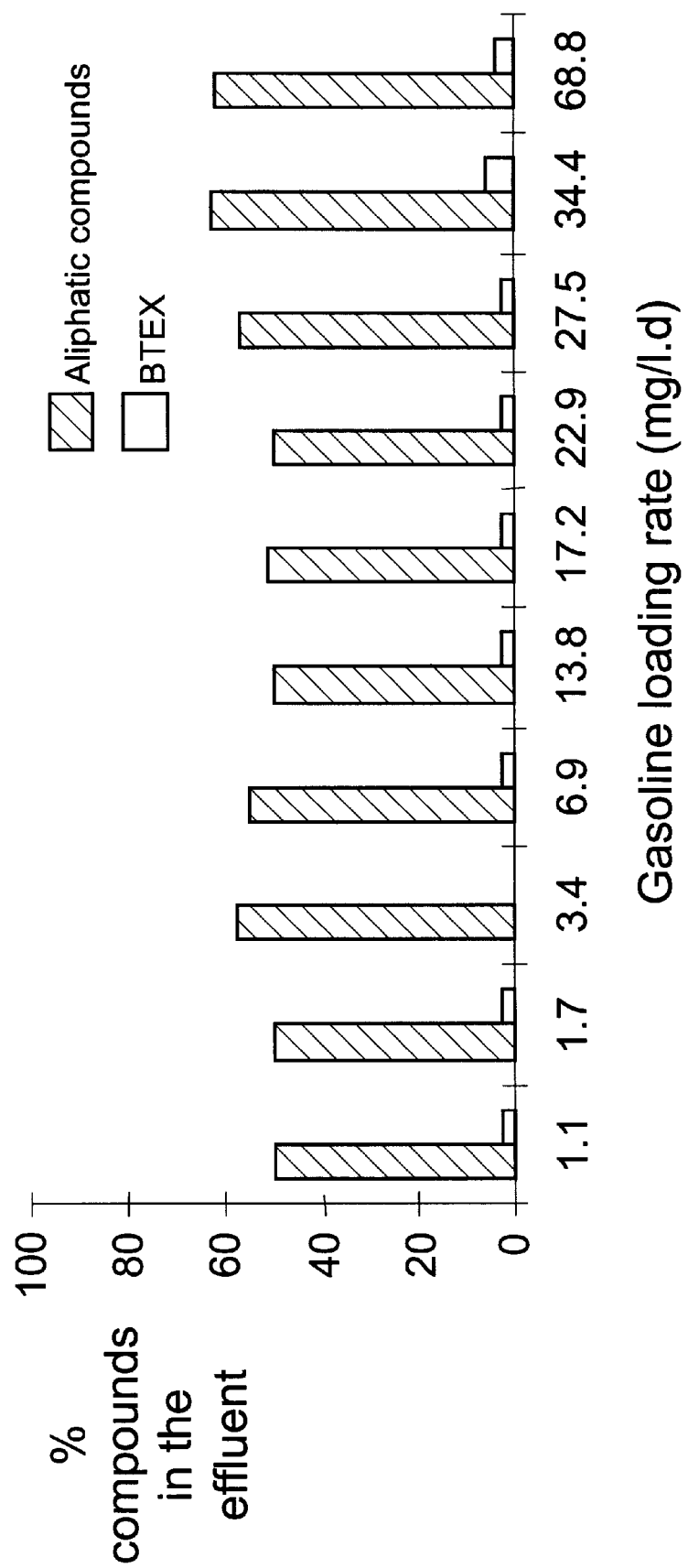
FIG. 5 illustrates the performance of the stainless steel packed reactor in removing BTEX and certain aliphatic compounds.

Analysis of the gasoline components in the effluent of the biobarrier revealed that the remaining fraction of gasoline consisted mainly of three aliphatic compounds appearing before benzene during chromatographic analysis. These aliphatic compounds were found to be mainly responsible for the incomplete removal efficiency (<100%) of the stainless steel-packed biobarrier (FIG. 5). In this biobarrier, the exit concentration of BTEX was less than 5.7% while the three aliphatic compounds comprised up to 63.1% of the effluent's organic content. The initial BTEX content of gasoline was approximately 28.9% while the three aliphatic compounds of interest initially comprised almost 16.4% of gasoline.

The measurements of dissolved oxygen (DO) concentration in the effluent as well as at the first sampling port of the biobarriers (3 cm from the inlet) showed values of less than 0.3 mg/l (frequently near zero) under the conditions examined in this work. This indicates that the supplied oxygen was quickly consumed leading to a decrease in the DO concentration. As a result, a microaerophilic condition was established along the entire length of the biobarriers. The inlet feed stream into the biobarriers had a dissolved oxygen concentration of 8 mg/l. However, a mass balance of the degraded gasoline and the available oxygen indicated that the supplied oxygen was not sufficient to support complete aerobic biodegradation of gasoline even at the lowest concentration of gasoline employed in this study. The inlet gasoline concentration into the biobarriers ranged from 3.7 to 74.0 mg/l, while the inlet oxygen concentration was 8 mg/l. Considering 3 mg oxygen required for aerobic biodegradation of 1 mg of gasoline, the supplied oxygen was only sufficient to support the aerobic oxidation of 72% to 3.6% gasoline, far less than the requirements for complete aerobic biodegradation of gasoline.

The high gasoline removal efficiencies of greater than 99% obtained with limited supply of oxygen imply that the microaerophilic condition did not prevent the degradation of gasoline. Two mechanisms are proposed for the biodegradation of gasoline hydrocarbons: first, the contribution of anaerobic metabolism, implying that in addition to oxygen an alternative electron acceptor was present in the system, stimulating hydrocarbon biodegradation under mixed electron-acceptor condition, and second, the aerobic transformation of hydrocarbons into intermediate metabolites.

The occasional analysis of remaining sulfate in the biobarriers' effluents showed the consumption of 5.5 to 111 mg/l of sulfate with the change of inlet gasoline concentration from 3.7 to 37 mg/l. Based on the theoretical 5.1 mg sulfate required for the oxidation of 1 mg gasoline, the consumed sulfate was sufficient for the anaerobic oxidation of 100% to 63.6% of the remaining gasoline. The remaining gasoline refers to the fraction that could not have been degraded aerobically, based on the availability of 8 mg/l of oxygen in the feed. Sulfate has been recognized as a terminal electron acceptor in the biodegradation of hydrocarbons. Sulfate reduction can be linked to anaerobic biodegradation of benzene, toluene and other monocyclic aromatics with only $CO_2$ production and no accumulation of end products. Other electron acceptors such as oxidized metals, possibly present in the biobarrier, may have contributed to the acceptance of electrons during the biodegradation of hydrocarbons. It is also possible that some gasoline constituents, particularly those which are more recalcitrant under anaerobic condition (such as benzene), were not completely mineralized but were partly transformed to intermediate metabolites.

Figure 7B:
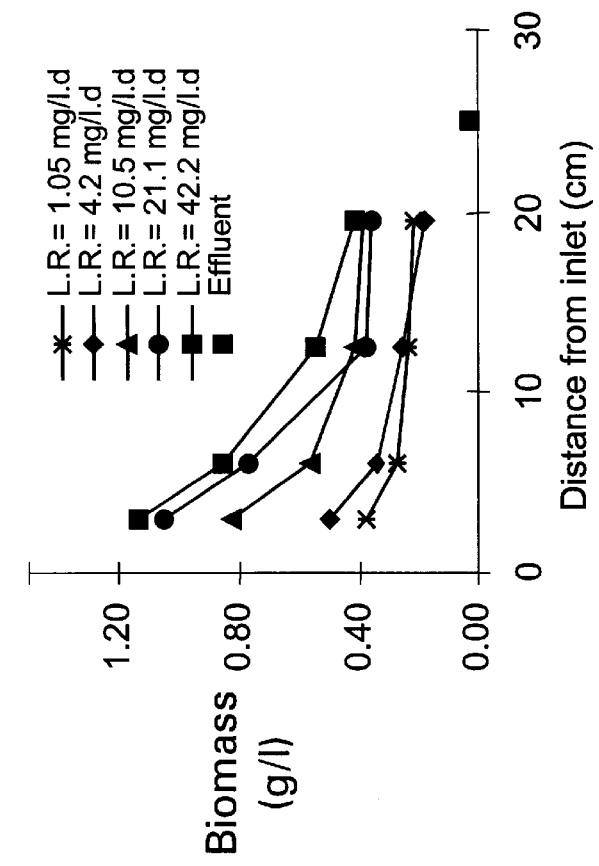
FIG. 7b is a similar graph as FIG. 7a, for a peat moss packing.
Figure 7A:
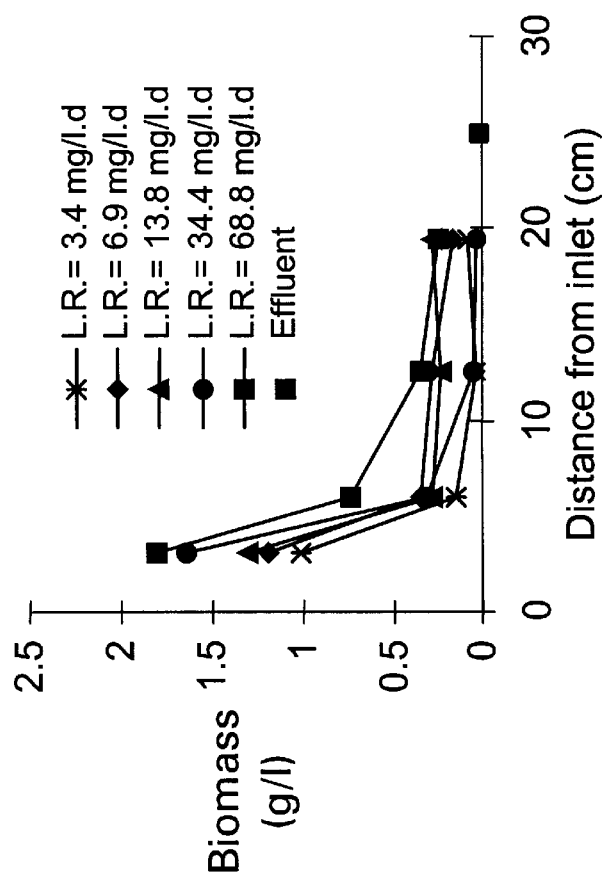
FIG. 7a is a graph showing concentration profiles of biomass along the length of the bioreactor packed with stainless steel packing.

The concentrations of biomass and gasoline exhibited a declining gradient along the length of the biobarriers. Typical examples of concentration profiles of gasoline and biomass are presented in FIGS. 6a, 6b and 7a, 7b, respectively. The total concentration of biomass including free as well as attached cells were used in these graphs. In the peat moss-packed biobarrier, the fraction of attached to free cells ranged from 30.8% to 41.2%, while in the stainless steel-packed biobarrier this fraction ranged from 4.2% to 8.1%. Both biomass and gasoline gradients were steeper in the stainless steel-packed biobarrier (FIG. 6a and 7a) indicating the highest biomass accumulation and the greatest gasoline biodegradation within the first 3 cm of the biobarrier. Indeed, the major fraction of gasoline (up to 92%) was removed before the first port under all the conditions examined. This indicates the great capacity for gasoline removal in the stainless steel-packed biobarrier and the very high rate of gasoline removal during the first few centimeters of this biobarrier. In the peat moss-packed biobarrier, biomass concentration was highest at the first port but it had a more gradual decrease with the increase of distance from the inlet port. Similarly, gasoline removal along the length of this biobarrier was slower, exhibiting removal of the major fraction of gasoline (up to 96%) in the first 6 cm of the biobarrier. Under similar conditions of gasoline loading rate the concentration of biomass at the first port was higher in the stainless steel-packed biobarrier compared to that in the peat moss-packed biobarrier.

The results of laboratory-scale operation under the conditions commonly found underground (note that the velocity of the tested mixture entering the biobarrier, while maintained with pumps, closely resembled a typical linear velocity of an underground stream), and with two different types of packings indicated that the apparatus of the invention is indeed effective for environmental applications, with particular use for petroleum derived hydrocarbons e.g. gasoline. It will of course be understood that while the tests were conducted in an above-ground setup, they were designed to model, and determine the performance of, an underground, gravity operated bioreactor.

The gasoline and BTEX removal efficiencies were independent of the applied operating conditions of the biobarriers.

The biobarrier of the invention provides high efficiency of >99% obtained under limited supply of molecular oxygen, exhibiting a near complete removal of high concentrations of gasoline under low DO conditions normally found underground.

As evidenced by the above results, the stainless steel-packed biobarrier usually exhibited a superior performance over the peat moss packed reactor in terms of both efficiency of gasoline removal (Table 1), and the volumetric elimination rate (FIG. 3a and 3b). The higher efficiency of contaminant removal is attributed to the differences in the nature of packings reflecting their porosity, biofilm structure and oxygen transfer efficiencies. Contaminant transport into the biofilm has been shown previously to control the performance of biofilm systems, limiting the process efficiency. Also, the nature of the microbial culture in the two biobarriers compared, SS and PM, were found to be different, contributing to the differences in their performances. In addition to the efficiency of removal, the stainless-steel packed biobarrier exhibited a consistently higher elimination rate under similar operating conditions as a result of the higher free space, reflecting its superior capacity of contaminant removal per unit volume of the biobarrier.

This means that if the two biobarriers are placed in front of a plume, the stainless steel-packed biobarrier exhibits a higher rate of contaminant removal per unit volume compared to the peat moss-packed biobarrier for any given liquid velocity.

The presence of biomass and gasoline gradients along the length of the biobarriers stems from the design of the system and the feeding technique (FIG. 1). Under this configuration the concentration of substrate is highest at the inlet and gradually decreases with increased distance from inlet. In the stainless steel-packed biobarrier, the high biomass concentration at the first port metabolized the majority of the substrate, leaving little or no substrate to support microbial growth further along the biobarrier. However, in the peat moss-packed biobarrier the presence of biomass was observed at the other ports along the biobarrier. This was due to gasoline adsorption on peat moss and its subsequent desorption during the process supporting microbial growth all along the biobarrier.

The establishment of a mixed microbial population inside a biobarrier reactor is important in maintaining their high performances under the changing conditions of the organic substrate and oxygen concentrations.

TABLE 1

Gasoline removal efficiencies during continuous-flow operation of the biobarriers.

| HRT (days) | Initial gasoline (mg/l) | Removal efficiency (%) | |
|---|---|---|---|
| | | S.S. | P.M. |
| 6 | 44.4 | 99.3 | 98.8 |
| 3 | 3.7 | 99.5 | 86.6 |
| 3 | 11.1 | 99.6 | N.A. |
| 3 | 22.2 | 99.2 | 93.5 |
| 3 | 44.4 | 99.9 | 98.9 |
| 3 | 74 | 99.6 | 99.2 |

TABLE 1-continued

Gasoline removal efficiencies during continuous-flow operation of the biobarriers.

| HRT (days) | Initial gasoline (mg/l) | Removal efficiency (%) S.S. | Removal efficiency (%) P.M. |
|---|---|---|---|
| 2 | 3.7 | 99.7 | 90.5 |
| 2 | 37 | 99.2 | 99.4 |
| 2 | 74 | 99.6 | 96.9 |
| 1 | 3.7 | 99.4 | 95.2 |
| 1 | 14.8 | 99.1 | 96.3 |
| 1 | 37 | 99.3 | 99.6 |
| 1 | 74 | 94.0 | 96.8 |
| 0.5 | 14.8 | 99.9 | 89.8 |

We claim:

1. An in-situ reactor for at least partially biodegrading petroleum-derived hydrocarbons present in an underground aqueous mixture or stream, said reactor comprising:
 a chamber disposed underground, devoid of pumping equipment and having:
  an inlet adapted to allow a flow by natural hydraulic gradient of a contaminated mixture or stream through the chamber and an outlet for a treated mixture or stream,
  a volume of a solid, substantially rigid, non-sorptive packing in said chamber, said packing disposed to leave a free space of at least 75%, and
  an amount of microorganisms disposed on and within said packing, said microorganisms effective to at least partially biodegrade said hydrocarbons from said mixture or stream.

2. The reactor according to claim 1 wherein said packing is corrosion resistant.

3. The reactor according to claim 2 wherein said packing is of stainless steel.

4. The reactor according to claim 1 wherein said packing is composed of perforated separable pieces.

5. A method of at least partially biodegrading petroleum derived hydrocarbons present in an underground aqueous mixture or stream, the method comprising
 supporting a population of microorganisms specific to petroleum-derived hydrocarbons on and within a substrate packing confined in a chamber devoid of pumping equipment, disposed underground in the path of an underground stream to be treated, the chamber configured to allow said mixture or stream to flow therethrough by natural hydraulic gradient, such that said stream contacts said microorganisms, and
 allowing said aqueous stream or mixture to pass through said packing by natural hydraulic gradient such that said microorganisms decompose at least partly said hydrocarbons in said mixture or stream as it flows through said packing,
 wherein said packing comprises solid, substantially rigid non-sorptive elements which leave a free space of at least 75%.

6. The method of claim 5 further comprising maintaining predominantly microaerophilic conditions in said mixture or stream during its passing through said packing.

7. The method according to claim 5 wherein said microorganism population is heterogenous, mixed microbial population originated from indigenous soil microbial community.

* * * * *